United States Patent
Kultgen

(10) Patent No.: US 7,417,509 B2
(45) Date of Patent: Aug. 26, 2008

(54) SPREAD SPECTRUM MODULATION OF A CLOCK SIGNAL FOR REDUCTION OF ELECTROMAGNETIC INTERFERENCE

(75) Inventor: Michael Alfred Kultgen, Colorado Springs, CO (US)

(73) Assignee: Linear Technology Corporation, Milpitas, CA (US)

( * ) Notice: Subject to any disclaimer, the term of this patent is extended or adjusted under 35 U.S.C. 154(b) by 102 days.

(21) Appl. No.: 11/366,590

(22) Filed: Mar. 3, 2006

(65) Prior Publication Data

US 2007/0216488 A1     Sep. 20, 2007

(51) Int. Cl.
    *H03L 7/00*     (2006.01)
(52) U.S. Cl. .......................... 331/16; 331/78; 332/123; 375/130
(58) Field of Classification Search ................ 331/10, 331/16, 78; 332/123; 375/130
    See application file for complete search history.

(56) References Cited

U.S. PATENT DOCUMENTS

| 6,342,817 | B1 | 1/2002 | Crofts et al. | |
| 6,614,313 | B2 | 9/2003 | Crofts et al. | |
| 2005/0008113 | A1* | 1/2005 | Kokubo et al. | 375/376 |

OTHER PUBLICATIONS

"Low-Frequency, Spread-Spectrum EconOscillator," Dallas Semiconductor MAXIM, DS1090.
"Multiphase Oscillator with Spread Spectrum Frequency Modulation," Linear Technology, LTC6902.

* cited by examiner

Primary Examiner—Robert J. Pascal
Assistant Examiner—Levi Gannon
(74) Attorney, Agent, or Firm—McDermott Will & Emery LLP

(57) ABSTRACT

A spread spectrum frequency modulated oscillator circuit usable as a clock comprises a reference component such as a resistor, a voltage controlled oscillator and a first circuit coupled to the reference component and voltage controlled oscillator and configured to supply a first control signal to the oscillator to cause the oscillator to oscillate at a frequency corresponding to a value of the reference component. A second circuit configured to supply a random signal to the oscillator causes the frequency of the oscillator to dither. To cause the oscillator to exhibit random frequency modulation that is fast enough to reduce EMI but not too fast for controlled devices such as switching regulators to track, the oscillator includes a third circuit configured to control (1) a rate of change of the oscillator frequency such that the rate of change is a fixed percentage of the oscillator frequency, and (2) an amount of frequency change in the oscillator frequency such that the amount of frequency change is a fixed percentage of the oscillator frequency.

17 Claims, 4 Drawing Sheets

SPREAD SPECTRUM MODULATION OF A CLOCK SIGNAL FOR REDUCTION OF ELECTROMAGNETIC INTERFERENCE

TECHNICAL FIELD

This disclosure relates generally to oscillator clock sources, and more particularly to improving electromagnetic interference by frequency modulating a clock using spread spectrum frequency modulation.

BACKGROUND DESCRIPTION

Electronic devices, such as switching regulators often generate electromagnetic interference which can be detrimental to the operation of electronic circuits in which such devices are employed. Switching regulators translate all input voltage at one level to an output voltage at another. Energy from an input voltage source is stored in an inductor or capacitor and then transferred, or switched, to the output. Energy transfer is repeated at a rate determined by the clock source of the regulator. The switching action generates interference, the energy of which is concentrated at frequencies which are harmonics of the clock source.

The output of a switching regulator is a DC level signal plus interference created by clock-controlled switching. Different switching regulators require different clock frequencies. Consequently, the interference from a switching regulator differs from design to design. Techniques to reduce interference should be effective for clocks of both slow and fast clocking frequencies. If the clock frequency of a regulator is dynamically varied, it is possible to spread the interference energy over a range of frequencies, reducing the energy at any one frequency. This technique is known as spread spectrum frequency modulation.

Methods to implement spread spectrum frequency modulation have included modulation with periodic waveforms such as triangular or sinusoidal waveforms, and random modulation. However, each of these techniques has drawbacks.

The shape of a modulating waveform will affect the shape of the interference spectrum. FIG. 1 illustrates the output of a typical switching regulator with periodic sinusoidal frequency modulation of the clock source. The upper trace 102 is the modulating signal. The lower trace 104 is the output of the regulator. The lower trace 104 appears as an amplitude variation of the switching induced interference. Even though the interference energy near the clocking frequency has been "spread," a low frequency large amplitude component has been added to the spectrum. This "amplitude modulation" could easily corrupt the operation of electronic circuits, a result which nullifies the benefits of the sinusoidal modulation.

Random modulation provides an improvement over the use of a periodic waveform. If the clock source of a switching regulator is randomly varying, using, for example, a technique termed "frequency hopping," then the resulting amplitude modulation of the interference will be random. Random amplitude variations are indistinguishable from noise. However, the difficulty with random modulation lies in the generation of an optimal random signal. A random signal should be provided that produces reduction of EMI at both fast and slow hopping rates within the ability of practical regulators to track them. Lowpass filtering is employed for this purpose, without which the output will tend to exhibit ripple. Too much filtering, however, will negate the benefit of random modulation.

There is a need for a product which generates a wide range of clock frequencies to cover many switching regulator applications. At any clock frequency, the product should exhibit random frequency modulation which is fast enough for good EMI reduction, yet not too fast for switching regulators to track.

SUMMARY

A spread spectrum frequency modulated oscillator circuit comprises a reference component, a controlled oscillator and a first circuit coupled to the reference component and controlled oscillator and configured to supply a first control signal to the oscillator to cause the oscillator to oscillate at a frequency corresponding to a value of the reference component. Included are a second circuit configured to supply a random signal to the oscillator to cause the frequency of the oscillator to dither, and a third circuit configured to control (1) a rate of change of the oscillator frequency such that the rate of change is a fixed percentage of the oscillator frequency, and (2) an amount of frequency change in the oscillator frequency such that the amount of frequency change is a fixed percentage of the oscillator frequency.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

A spread spectrum frequency modulated oscillator circuit is described which generates a wide range of frequencies, exhibiting random frequency modulation which is fast enough to reduce electromagnetic interference (EMI), yet able to be tracked reliably by a device using the oscillator circuit, such as a switching regulator.

Figure 1:
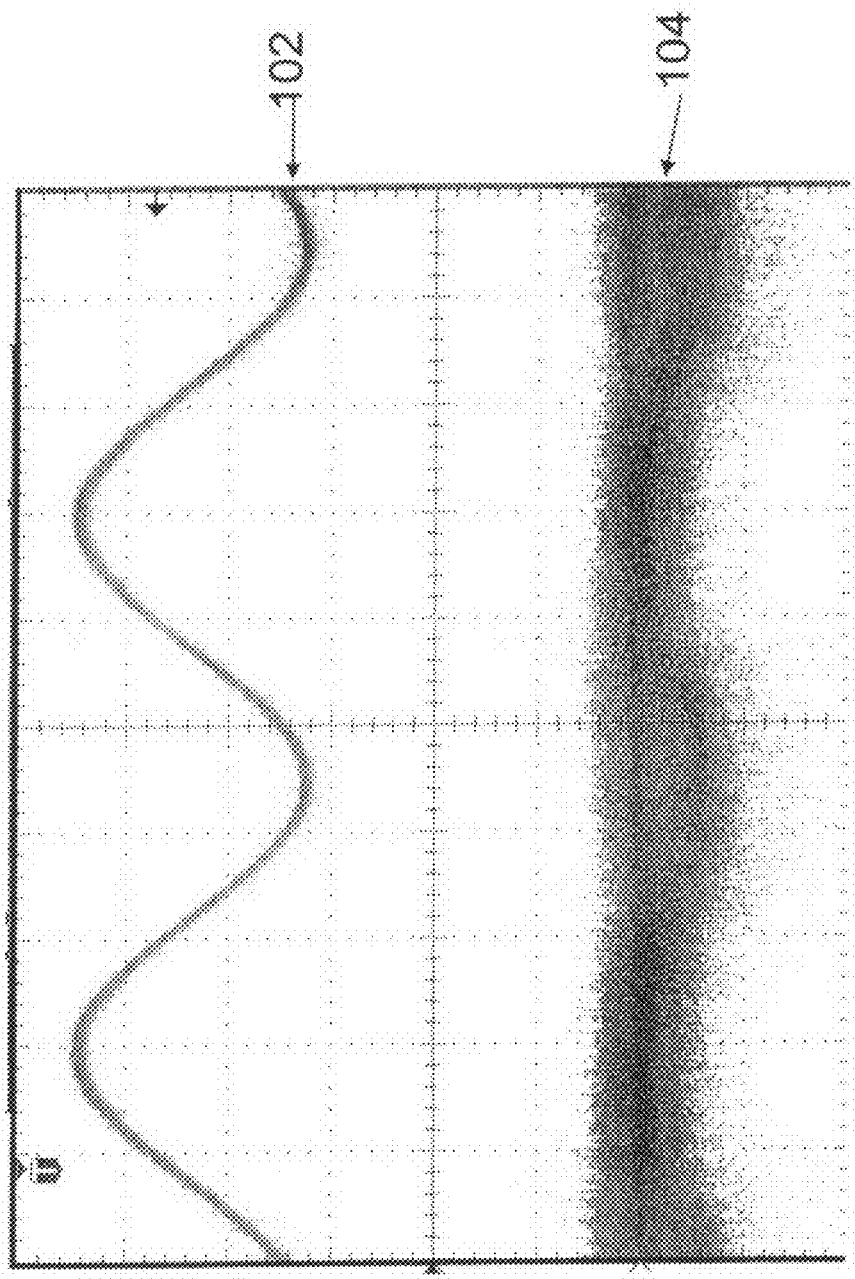
FIG. 1 depicts a graph of a typical switching regulator output using periodic frequency modulation of the clock source.
Figure 2:
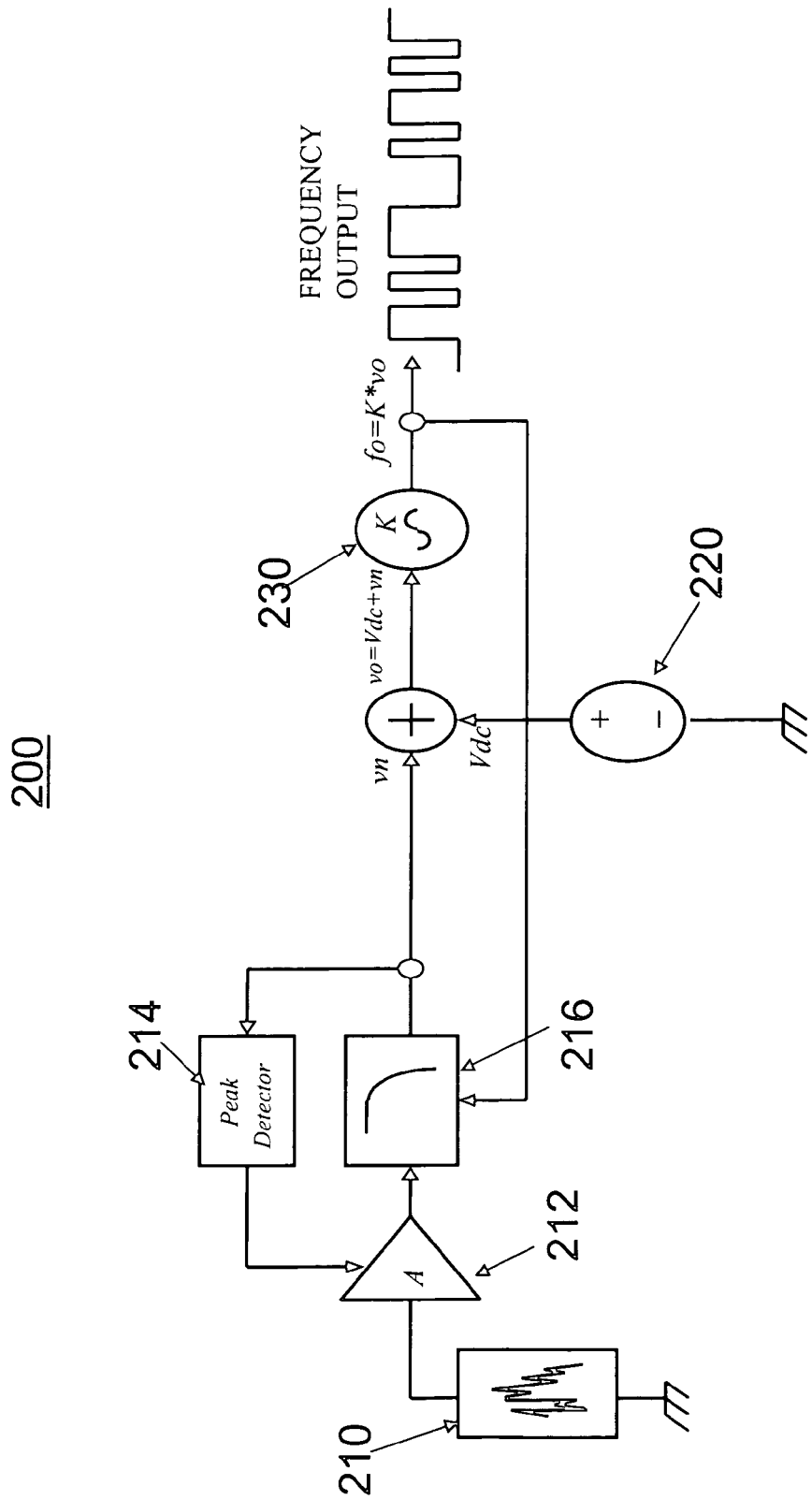
FIG. 2 depicts a circuit diagram of an oscillator circuit, in accordance with one embodiment of the invention.

FIG. 2 is a diagram of an oscillator circuit 200, in accordance with one embodiment of the invention. Oscillator circuit 200 includes a voltage controlled oscillator (VCO) 230, whose output frequency is controlled by a DC source 220 which supplies a constant voltage for setting the mean output frequency of the VCO, and a random voltage source 210 which produces a random voltage signal to modulate, or "dither" the VCO frequency. While voltage signals are used in FIG. 1 to control the oscillator, other signals may be used, such as currents or numbers.

The generated random voltage signal is added to the supplied constant voltage signal to produce a control signal vo to control VCO 230. A user selectable gain K may be used to vary the frequency of the oscillator over a wide range. A variable bandwidth lowpass filter 216 may be provided to limit the rate of change of the signal output by VCO 230. Amplifier 212 and peak detector 214 ensure a constant peak-to-peak amplitude out of the filter as the bandwidth changes.

An ideal VCO can be described by the equation fo=K*vo, where K is a constant. If the control voltage vo varies with time, then the frequency output of the VCO, fo, will vary with time, creating a frequency modulated signal. To generate a spread spectrum frequency modulated (SSFM) signal, in accord with the principles taught herein, (1) the rate of change of control voltage vo is kept small compared to the peak-to-peak change of vo, and (2) the probability distribution of the amplitude of vo is uniform. A slowly varying control voltage with uniformly distributed amplitude will result in a flat frequency spectrum, which is desirable for the reduction of EMI.

Rate of Change of vo

In frequency modulation systems, a useful term is $\beta$, or "modulation index." The modulation index $\beta$ may be defined as $$\beta \equiv \frac{\Delta fo}{fo_m},$$

where $\Delta fo$ is the deviation in the output frequency and $fo_m$ is the maximum rate of change of the output frequency. For example, if the output frequency is nominally 1 MHz and deviates +10% at a 20 KHz rate, then $$\beta = \frac{1.1 \text{ MHz} - 0.9 \text{ MHz}}{20 \text{ KHz}} = 10$$

Since the output of the VCO is linearly related to the control voltage vo, the modulation index can be expressed as $$\beta \equiv \frac{\Delta vo}{vo_m}$$

where $\Delta vo$ is the peak-to-peak change in the control voltage and $vo_m$ is the maximum rate of change of the control voltage.

As described previously in respect of FIG. 2, user selectable gain K may be used to vary the frequency of the oscillator. The bandwidth of lowpass filter 216 tracks the VCO frequency. Thus, the rate of frequency change increases in proportion to K. Furthermore, as the amplitude of the signal from the filter is held constant by peak detector 214 and amplifier 212 in closed loop control, an increase in K increases the peak deviation. Accordingly, $\beta$ is held constant for all output frequencies.

Uniform Amplitude Probability Density

Figure 3:
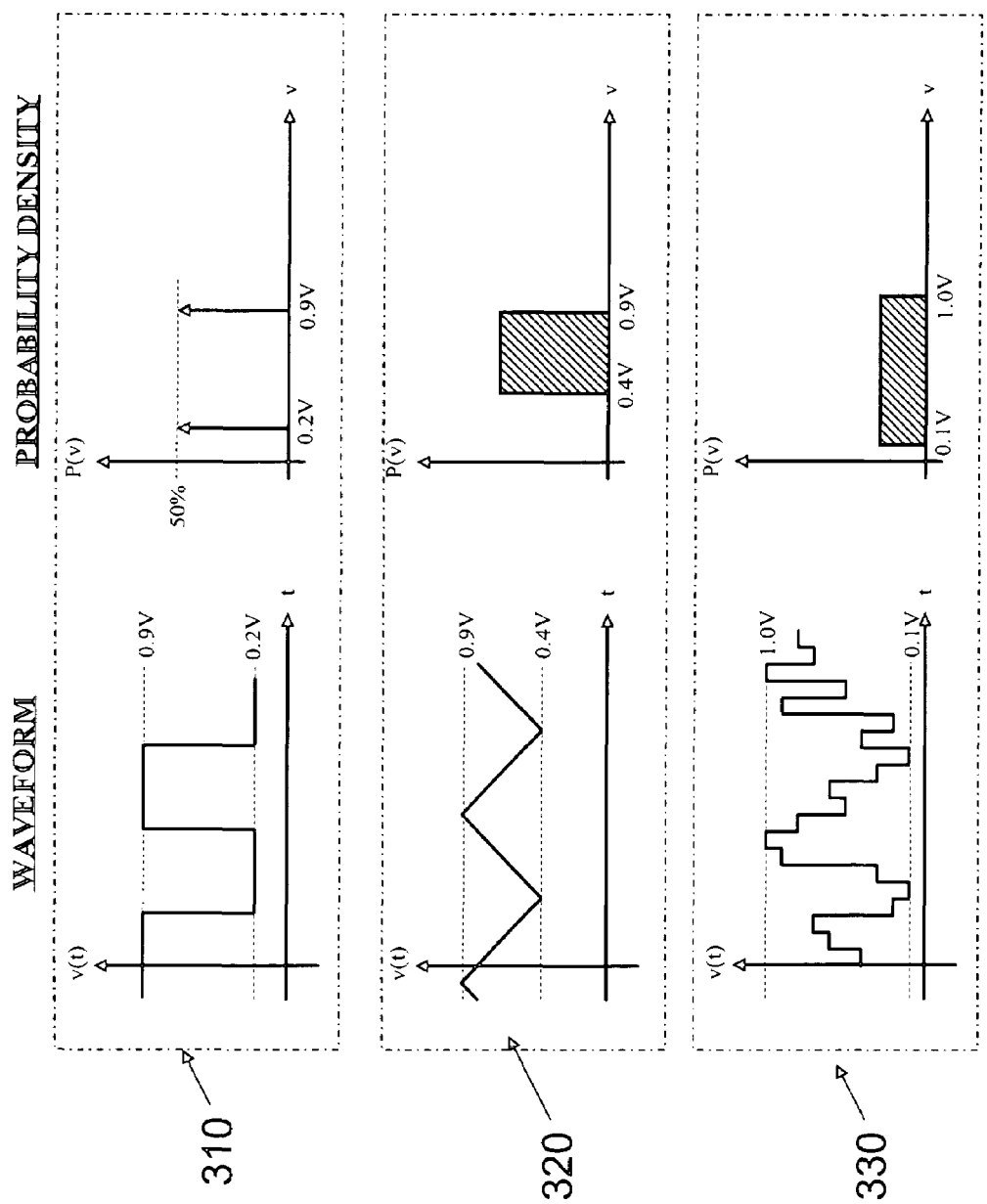
FIG. 3 depicts several waveforms and their corresponding amplitude probability densities.

The random voltage signal produced by random voltage source 210 ensures that the probability density, of the control voltage vo is uniform. To illustrate the advantageous characteristics of random voltage signal generation in this context, FIG. 3 depicts some common waveforms that may be used to frequency modulate a clock signal. At any instant in time, the amplitude of a square wave 310 has a 50% probability of being 0.2V and a 50% probability of being 0.9V. The amplitude of the a triangular waveform 320 has an equal probability of being any value between 0.4V and 0.9V. The amplitude of a random waveform 330 has an equal probability of being any value between 0.1V and 1.0V. Hence, a triangular waveform and a random waveform have uniform probability densities; a square wave waveform does not. However, as a triangular waveform is periodic, it will tend to generate undesirable amplitude components despite spreading.

Figure 4:
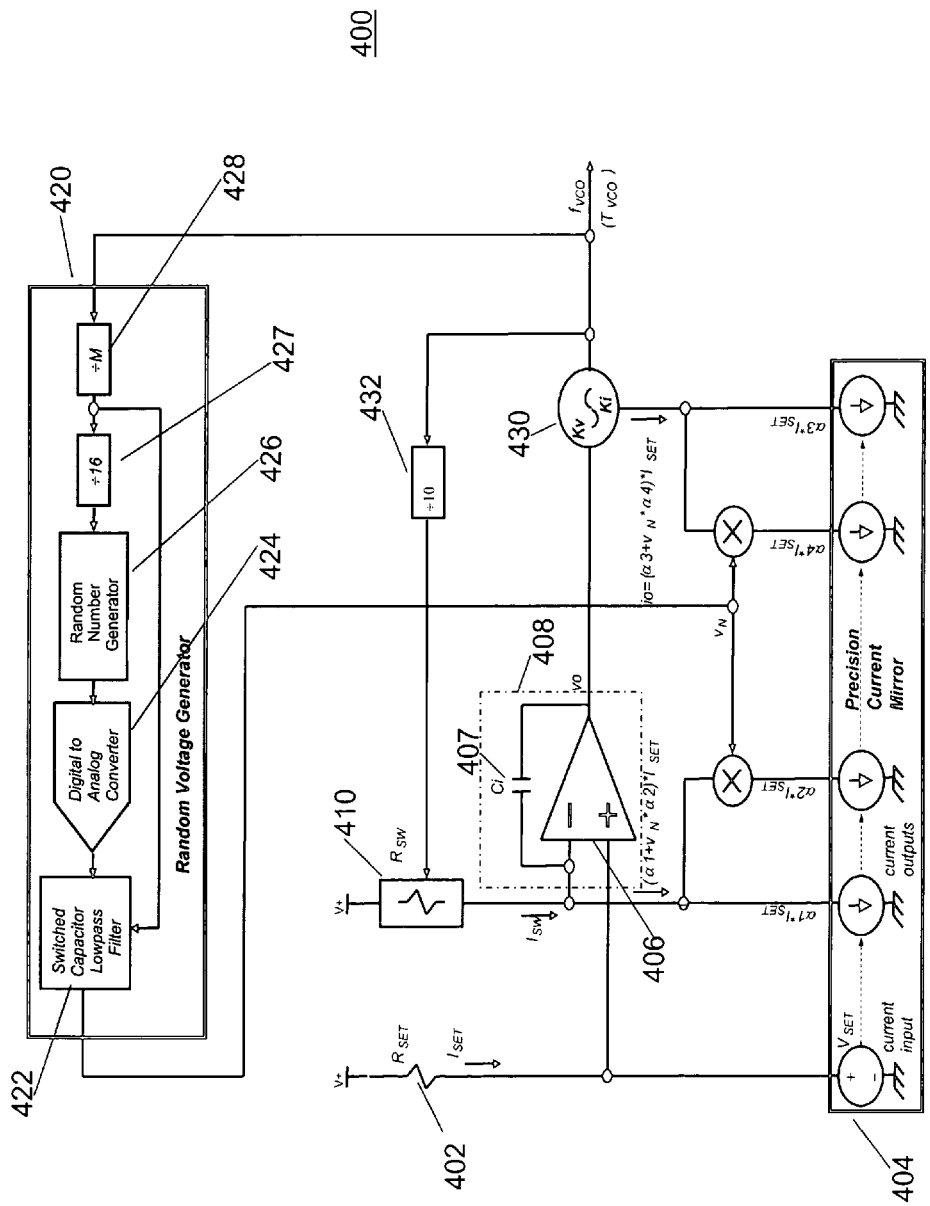
FIG. 4 depicts an oscillator circuit diagram, in accordance with one embodiment of the invention.

FIG. 4 depicts a SSFM oscillator circuit 400 according to another exemplary embodiment of the invention, in which the oscillator circuit includes a random voltage generator 420 for applying random modulation to the frequency signal generated by controlled oscillator 430. While controlled oscillator 430 is depicted as a voltage and current controlled oscillator, other forms of two input port controlled oscillators may be used.

Ignoring for the present random voltage generator 420, oscillator circuit 400 is a closed loop circuit that comprises a controlled oscillator 430 whose frequency is controlled alternatively by input voltage vo and input current io. As either input voltage or current (or both) is increased, the output frequency of the controlled oscillator 430 will increase. Control input voltage vo is produced by an integrator 408 composed of operational amplifier 406 and feedback capacitor 407. The non-inverting input of integrator 408 receives a reference voltage that corresponds to the difference between the supply voltage V+ and a voltage drop across resistor $R_{SET}$ 402, the value of which is user determined. The non-inverting input receives a dynamic voltage $V_{SET}$ that corresponds to the difference between supply voltage V+ and a voltage drop across resistor $R_{SW}$ 410, the resistance value of which tracks oscillator 430 frequency through divider 432. Control input current io is produced by current sources 404 mirrored from input current Iset at various prescribed ratios, represented by coefficients $\alpha$, for purpose that will become clear hereinafter.

According to the illustrated example, resistor 410 is a frequency controlled resistor that may be implemented in a semiconductor circuit as a switched capacitor, that is, a capacitor whose effective resistance is related to the repetition rate of a switch connected to bypass it. The frequency controlled resistor 410 in this example may have a value $$R_{SW} = \frac{10}{C_{SW} * f_{VCO}}.$$

As current flows through integrator 408, the output vo of the integrator increases from zero volt or other initial value, causing controlled oscillator 430 to begin to oscillate. Further increases in the integrator output vo cause the output frequency $f_{VCO}$ to increase. The controlled oscillator output signal is fed back to frequency controlled resistor 410 to cause the value of resistor 410 to track oscillator frequency. As the resistance of the described resistor 410 is inversely proportional to applied frequency, current $I_{SW}$ flowing through the resistor increases as $f_{VCO}$ increases. In equilibrium, current $I_{SW}$ matches current $I_{SET}$, and the output frequency of oscillator 430 may be determined by the equation $$f_{VCO} = \frac{\alpha 1 * 10}{R_{SET} * C_{SW}} = \frac{Fo}{R_{SET}}$$

where Fo is a constant determined by the capacitor value $C_{SW}$ and the current mirror ratio $\alpha 1$. As this equation indicates, the output of integrator 408 thus will track to any voltage necessary for the loop to reach equilibrium, independently of oscillator input control, within the limits of the power supply. A user thus can accurately select a wide range of clock (oscillator) frequencies simply by changing the value of the user selectable resistor 402 ($R_{SET}$).

Random voltage generator 420 is introduced to superimpose random variations on to the oscillator control quantities vo and io, so as to randomly modulate, or "dither", the oscillator frequency. Random voltage generator 420 may, as shown, include a switched capacitor lowpass filter 422, a digital-to-analog converter 424, a random number generator 426, and dividers 427 and 428 interconnected in a conventional manner. Random voltage generator 420 receives the output of controlled oscillator 430. Divider 428 may be used to increase the ratio of the controlled oscillator frequency to filter bandwidth. Therefore, increasing the value of divider 428 increases the modulation index $\beta$. For a given value of divider 428, the modulation index $\beta$ remains constant for all values of VCO frequency. Switched capacitor filter 422 smoothes the output of digital-to-analog converter 424 to prevent abrupt frequency changes.

Random voltage generator 420 generates a random voltage $V_N$ to create an apparent random fluctuation in the user selectable resistor 402, which in turn creates random fluctuations in the output frequency $F_{VCO}$. A fraction of the current $I_{SET}$ is multiplied by the random voltage $V_N$. The new current from the user-selectable resistor 402 applied to alter the voltage applied to the summing junction $I_{SET}*(\alpha 1+V_N*\alpha 2)$. The term $I_{SET}*\alpha 1$ sets the output frequency of the oscillator; the term $I_{SET}*V_N*\alpha 2$ generates the random modulation component of output frequency.

Integrator 408, however, within the context of presenting random modulation to oscillator 430, undesirably imparts additional filtering to the added random term. To compensate for this filtering, a second random signal is applied to the current input of the controlled oscillator 430. The second signal is defined by the equation $I_{SET}*(\alpha 3+V_N*\alpha 4)$.

Any increase in either the voltage input or the current input of controlled oscillator 430 increases the output frequency of the oscillator, as described previously. The term $I_{SET}*V_N*\alpha 4$ generates random fluctuations in the control current applied to the control current input io of controlled oscillator 430.

Oscillator circuit 400 thus realizes a variable frequency clock source which has random modulation with a constant modulation index and a flat frequency spectrum. The output of the oscillator is adjustable over a large range of frequency by adjusting the value of user selectable resistor 402. The random voltage generator provides a modulation signal with a uniform amplitude distribution. The random signal applied to the integrator adds slowly varying random modulation, while adding a random signal into control signal io of the controlled oscillator 430 generates rapidly varying random modulation. Combined, the rate of change in the random modulation is determined by lowpass filter 422, allowing the modulation rate to track the output frequency for any user selectable output frequency. EMI may be reduced for any clock frequency.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims.

What is claimed is:

1. A spread spectrum frequency modulated oscillator circuit, comprising:
   a controlled oscillator having a frequency control input port;
   a first closed loop circuit coupled to the input port of the controlled oscillator, the first closed loop circuit comprising a variable bandwidth filter, a peak detector and a variable gain amplifier, wherein the peak detector and the variable gain amplifier are configured to produce a constant amplitude signal from the filter as a function of filter bandwidth;
   a random signal generator coupled to the first control loop of the oscillator circuit to modulate output signal frequency; and
   a second closed loop circuit comprising the filter and the controlled oscillator, the controlled oscillator producing an output signal of frequency determined by the first closed loop circuit, dithered randomly by the random signal generator, and in which bandwidth of the filter is controlled by the output signal produced by the controlled oscillator.

2. The oscillator circuit of claim 1, wherein the filter is a variable bandwidth low pass filter.

3. The oscillator circuit of claim 2, wherein
   the random signal is a random voltage signal filtered by the low pass filter, and
   a constant DC voltage is combined with the filtered random voltage to supply a control signal to the controlled oscillator.

4. The oscillator circuit of claim 3, wherein the controlled oscillator is a voltage controlled oscillator.

5. The oscillator circuit of claim 4, wherein the rate of change of the control voltage is small compared to the peak-to-peak change in the control voltage.

6. The oscillator circuit of claim 2, wherein the random signal is a random voltage signal.

7. The oscillator circuit of claim 3, wherein the gain of the controlled oscillator controls the mean output frequency of the controlled oscillator.

8. A spread spectrum frequency modulated oscillator circuit, comprising:
   an input adapted for coupling to a frequency setting resistor through which a reference current is caused to flow;
   a frequency controlled resistor;
   a controlled oscillator;
   an integrator circuit coupled to the frequency setting resistor and configured to drive the oscillator at a controlled frequency determined by a value of the frequency controlled resistor, and
   a random signal generator coupled to the integrator circuit for producing random fluctuations in the controlled frequency.

9. The oscillator circuit of claim 8, wherein the random signal generator comprises:

a digital to analog converter, a random number generator driving the analog to digital converter, and a switched capacitor filter to smooth the digital to analog converter output, in which random number generator is driven by, and the switched capacitor filter is synchronized to, the output of the controlled oscillator.

10. The oscillator circuit of claim 9, wherein the random signal generator further comprises a divider to increase the ratio of the output frequency to the filter bandwidth.

11. The oscillator circuit of claim 8, wherein the controlled oscillator provides a first feedback signal that controls the frequency controlled resistor and a second feedback signal applied to the random signal generator.

12. The oscillator circuit of claim 8, wherein the random signal generator supplies a first random signal that creates an apparent random fluctuation in the frequency setting resistor.

13. The oscillator circuit of claim 8, wherein the controlled oscillator has a controlled voltage input port and a controlled current input port.

14. The oscillator circuit of claim 13, wherein the integrator circuit supplies a first control signal to the voltage input port of the controlled oscillator, and the random signal generator supplies a second control signal to integrator circuit and the current input port of the controlled oscillator to compensate for the additional filtering.

15. The oscillator circuit of claim 8, wherein the frequency controlled resistor is a switched capacitor circuit.

16. A frequency modulated oscillator circuit, comprising:
a controlled oscillator having first and second input ports;
an integrator responsive to a reference signal and an output of the oscillator for providing a first control signal to the first input port of the oscillator to cause the oscillator to attain a mean output frequency prescribed by the reference signal; and
a random signal generator connected in a first circuit for supplying a random signal to the integrator, and in a second circuit for supplying the random signal to the second input port of the oscillator to cause the output frequency of the oscillator to dither.

17. The frequency modulated oscillator circuit of claim 16, including signal processing circuitry configured to control (1) a rate of change of the oscillator frequency such that the rate of change is a fixed percentage of the oscillator frequency, and (2) an amount of frequency change in the oscillator frequency such that the amount of frequency change is a fixed percentage of the oscillator frequency.

* * * * *